United States Patent
Yoon et al.

(10) Patent No.: US 7,912,467 B2
(45) Date of Patent: Mar. 22, 2011

(54) METHOD AND APPARATUS FOR CONTROLLING POWER SAVING MODE IN WIRELESS PORTABLE INTERNET SYSTEM

(75) Inventors: Chul-Sik Yoon, Daejeon (KR);
Jae-Heung Kim, Daejeon (KR);
Kun-Min Yeo, Daejeon (KR);
Soon-Yong Lim, Daejeon (KR);
Byung-Han Ryu, Daejeon (KR)

(73) Assignees: Electronics and Telecommunications Research Institute (KR); Samsung Electronics Co., Ltd. (KR); KT Corporation (KR); SK Telecom Co., Ltd. (KR); KTFreetel Co., Ltd. (KR); Hanaro Telecom, Inc. (KR)

( * ) Notice: Subject to any disclaimer, the term of this patent is extended or adjusted under 35 U.S.C. 154(b) by 957 days.

(21) Appl. No.: 10/584,717

(22) PCT Filed: Dec. 24, 2004

(86) PCT No.: PCT/KR2004/003444
§ 371 (c)(1),
(2), (4) Date: Jun. 7, 2007

(87) PCT Pub. No.: WO2005/064818
PCT Pub. Date: Jul. 14, 2005

(65) Prior Publication Data
US 2007/0274244 A1    Nov. 29, 2007

(30) Foreign Application Priority Data

Dec. 26, 2003 (KR) .................. 10-2003-0097580
Oct. 18, 2004 (KR) .................. 10-2004-0083185

(51) Int. Cl.
*H04Q 7/38* (2006.01)

(52) U.S. Cl. .................. 455/435.1; 455/435.2; 455/574
(58) Field of Classification Search .................. None
See application file for complete search history.

(56) References Cited

U.S. PATENT DOCUMENTS

| 5,625,882 | A | 4/1997 | Vook et al. |
| 6,438,375 | B1 * | 8/2002 | Muller .................. 455/435.3 |
| 6,622,251 | B1 * | 9/2003 | Lindskog et al. .................. 713/300 |

FOREIGN PATENT DOCUMENTS

WO    WO 96/19084    6/1996

OTHER PUBLICATIONS

Chiasserini et al., "Improving Energy Saving in Wireless Systems by Using Dynamic Power Management", IEEE Transactions on Wireless Communications, vol. 2, No. 5, Sep. 2003.
Yoon et al., "Enhancement on Sleep Mode Operation by Grouping", IEEE 802.16 Broadband Wireless Access Working Group, Jan. 2, 2004.

* cited by examiner

*Primary Examiner* — Phuoc Doan
(74) *Attorney, Agent, or Firm* — The Farrell Law Firm, P.C.

(57) ABSTRACT

Disclosed is a method and device for controlling a power saving mode for applying the sleep mode for saving power consumption to the mobility of subscriber stations in a mobile communication network and a wireless Internet system. Subscriber stations entering the sleep mode are constantly grouped, listening intervals of the subscriber stations for each group are not superimposed, the existence state of traffic in the subscriber stations is independently notified for each group, and the overhead of signaling messages is minimized when the traffic is notified to the subscriber station in the sleep mode.

21 Claims, 15 Drawing Sheets

METHOD AND APPARATUS FOR CONTROLLING POWER SAVING MODE IN WIRELESS PORTABLE INTERNET SYSTEM

BACKGROUND OF THE INVENTION (a) Field of the Invention

The present invention relates to a power saving mode control method and device in a wireless portable Internet system. More specifically, the present invention relates to a power saving mode control method and device for using a power saving mode and a sleep mode for reducing power consumption of mobile terminals in a mobile communication system and a wireless Internet system.

(b) Description of the Related Art

A wireless portable Internet is a next generation communication scheme for further supporting mobility for short range data communication schemes which use fixed access points, such as the conventional wireless LAN. Various standards for the wireless portable Internet have been proposed, and the international standard of the portable Internet has progressed through the IEEE 802.16e.

FIG. 1 shows a diagram of the wireless portable Internet system.

As shown, the wireless portable Internet system includes a subscriber station (SS) 111 in cells 110 and 120, base stations 112 and 121 for performing radio communication with the SS 111 in the cells 110 and 120, routers 131 and 132 connected to the base stations 112 and 121 through a gateway, and the Internet 140. A personal computer is also provided as a terminal node 150.

The wireless LAN such as the conventional IEEE 802.11 provides a data communication scheme for allowing short-range wireless communication with reference to a stationary access point, and it does not provide mobility of the SS but rather it supports the short-range data communication in a wireless manner instead of on the cable basis.

The wireless portable Internet system driven by the IEEE 802.16 group guarantees mobility and provides a seamless data communication service when the SS 111 shown in FIG. 1 moves to another cell from a cell.

The IEEE 802.16 basically supports the metropolitan area network (MAN), and represents an information communication network covering an intermediate area between the LAN and the WAN.

Therefore, the wireless portable Internet system supports a handover of the SS 111 in a like manner of the mobile communication service, and assigns dynamic Internet protocol (IP) addresses according to movement of the SS 111.

In this instance, the SS 111 communicates with the base stations 112 and 121 through the orthogonal frequency division multiple access (OFDMA) system, which is a modulation and multiple access scheme having combined the orthogonal frequency division multiplexing (OFDM) scheme which uses the frequency division multiple access (FDMA) scheme for using a plurality of subcarriers of orthogonal frequencies as a plurality of subchannels, and the time division multiple access (TDMA). The OFDMA system is essentially resistant to the fading phenomenon generated on the multi-paths, and has high data rates.

Also, the IEEE 802.16 has adopted the AMC (adaptive modulation and coding) scheme for adaptively selecting a modulation and coding scheme according to a request and an acceptance between the SS 111 and the base stations 112 and 121.

FIG. 2 shows a hierarchical structure of the wireless portable Internet system.

As shown, the hierarchical structure of the wireless portable Internet system of the IEEE 802.16e includes a physical layer 210 and a media access control (MAC) layer 220, and the physical layer 210 is connected to the MAC layer 220 through a service access point (SAP).

The physical layer 210 performs radio communication functions executable on the general physical layer, such as modulation/demodulation, and coding.

The wireless portable Internet system does not have layers classified according to their functions, but allows a single MAC layer to perform various functions, differing from the wired Internet system.

Regarding sublayers according to functions, the MAC layer includes a privacy sublayer 221, an MAC common part sublayer 222, and a service specific convergence sublayer 223.

The service specific convergence sublayer 223 performs a payload header suppression function and a quality of service (QoS) mapping function in the case of seamless data communication.

The MAC common part sublayer 222, which is the core part of the MAC layer, performs a system access function, a bandwidth allocation function, a connection establishment and maintenance function, and a QoS management function.

The privacy sublayer 221 performs a device authentication function, a security key exchange function, and a data encryption function. The device is authenticated by the privacy sublayer L21, and the user is authenticated by an upper layer (not illustrated) of the MAC.

FIG. 3 shows a diagram of a connection configuration between a base station (BS) and an SS in the wireless portable Internet system.

The MAC layer 220a of the SS and the MAC layer 220b of the BS have a connection therebetween.

The phrase connection represents not a physically connected relation but rather a logically connected relation, and it is defined to be a mapping relation between MAC peers of the SS and the BS in order to transmit traffic of a single service flow.

Therefore, parameters or messages defined with respect to the connection represent the functions between the MAC peers, and in reality, the parameters or the messages are processed, are converted into frames, and are transmitted through the physical layers, and the frames are parsed and the functions which correspond to the parameters or the messages are executed on the MAC layer.

The MAC messages transmitted through the connection include: a connection identifier (CID) which is an MAC layer address for identifying connections; an MAP for defining a symbol offset, a subchannel offset of bursts time-divided by the SS in a downlink/uplink, a number of symbols, and a number of subchannels of allocated resources; and a channel descriptor for describing characteristics of the physical layer according to the characteristics of the downlink/uplink (a downlink channel descriptor will be referred to as a DCD and an uplink channel descriptor will be referred to as a UCD hereinafter).

In addition, the MAC messages include various messages for performing a request (REQ) function, a response (RSP) function, and an acknowledgement (ACK) function on various operations.

FIG. 4 shows a diagram for a frame structure of the wireless portable Internet system.

Referring to FIG. 4, frames include a downlink sub-frame and an uplink sub-frame depending on transmission directions. The vertical axis of the frame represents subchannel logical numbers, and the horizontal axis thereof denotes OFDMA symbol numbers.

The downlink sub-frame includes a preamble, a downlink MAP (DL-MAP), an uplink MAP (UL-MAP), and a plurality of downlink (DL) bursts. The DL bursts may not represent the channels or resources classified according to users, but they are classified according to transmission levels with the same modulation scheme or channel encoding. Further, the DL bursts can be provided for respective users.

The downlink MAP has offset information, modulation method information, and coding information on a plurality of users who use the same modulation method and channel coding, and allocates the resources to the users. Accordingly, the MAP has a feature of broadcast channels and requires strong robustness.

In the case of the uplink sub-frame, transmission is performed per user, and the uplink bursts have per-user information.

FIG. 5 shows a flowchart for establishing a connection process in the wireless portable Internet system.

Referring to FIG. 5, when an SS enters a base station's area in step S501, the BS establishes downlink synchronization with the SS in step S502. When the downlink synchronization is established, the SS acquires an uplink parameter in step S503. For example, the parameter can be included in a channel descriptor message according to the physical layer characteristics (e.g., useable burst profiles corresponding to the appropriate SNR (signal to noise ratio) levels).

A ranging process between the SS and the BS is performed in step S504. The ranging process for correcting timing, power, and frequency information between the SS and the BS performs an initial ranging process and a periodic ranging process after the initial ranging.

When the ranging process is finished, a negotiation on basic service provision capabilities for establishing connection between the SS and the BS is performed in step S505. When the negotiation on basic service provision capabilities is finished, the SS is authenticated in step S506 by using a device identifier including an MAC address and a certificate of the SS.

When the authentication for the SS is finished and a usage authorization on the wireless portable Internet is confirmed, a device address of the SS is registered in step S507, and an IP address is provided to the SS from an IP address management system such as a DHCP server to accordingly establish an IP connection in step S508.

The SS assigned with the IP address performs a connection-establishment process for data transmission in step S509.

The above-described wireless portable Internet system not only performs communication near a fixed location but also has mobility in the metropolitan level differing from the conventional wireless LAN communication systems, and hence, batteries are usually used to supply power to the SS, and the duration of the batteries is a major limitation of the usage time in the wireless portable Internet system.

Therefore, the wireless portable Internet system such as the IEEE 802.16e has proposed a sleep mode for reduction of battery power consumption. The sleep mode is a method for allowing a terminal to enter a sleep state during a sleep window, and reduce the SS's power consumption when no data to be transmitted to the SS is provided. After entering the sleep state, the SS performs no operation for data transmission during the sleep window, thereby saving the power consumption of the SS.

The SS is switched to a listening state each time the sleep window is terminated, and it checks whether data which stands by to be transmitted (to the corresponding terminal) during the sleep window are provided.

FIG. 6 shows a signal flowchart for a sleep mode operation in the wireless portable Internet system.

As shown, entering the sleep mode by the SS requires permission by the BS. The SS 111 attempting to enter the sleep mode establishes a sleep window to request a sleep mode from the BS 112 in step S601.

When receiving the sleep mode request, the BS assigns a sleep window to transmit a sleep mode approval to the SS in step S602.

When receiving the sleep mode approval, the SS enters the sleep mode for receiving no data at the sleep mode entering time M in step S603. When the initial sleep window is expired, the SS is switched to a listening mode to check whether data addressed to the SS (in a transmission standby state) are buffered from the BS during the sleep window in step S604.

In this instance, when no data addressed to the SS (in the transmission standby state) are buffered during the initial sleep window, the BS 112 establishes a message for indicating existence of data traffic to be 0 and transmits the same to the SS in step S605.

When it is determined that no data traffic is transmitted during the listening mode, the SS enters the sleep mode again in step S606. In this instance, the sleep window can be established to be equal to or longer than the initial sleep mode.

When data in the transmission standby state with respect to the SS 111 are provided during a second sleep window, the BS can buffer the data traffic in step S608, and existence of the buffered data are reported in the listening mode of the SS.

The BS 112 establishes a field corresponding to the message which indicates existence of data traffic to be a field (e.g., 1) for indicating the existence, or transmits a message which includes a list of basic CIDs which are identifiers of corresponding SSs to the SS in step S609. When receiving the message and checking that the data traffic to be transmitted to the SS 10 are found in the listening mode in step S607, the SS 111 terminates the sleep mode, enters an awake mode to receive the buffered data traffic, and performs data communication with the BS 20 in step S610.

The SS 10 proceeds to the sleep mode according to the sleep mode operation when there are no data to be transmitted, thereby preventing unnecessary power consumption.

FIGS. 7 and 8 show exemplified sleep windows in the conventional sleep mode.

FIG. 7 shows exemplified terminals operable by a power saving operation mode with a periodic sleep mode, and FIG. 8 shows a power saving mode operation with an exponentially increasing sleep window.

Referring to FIG. 7, a subscriber station SS1 (710) listens to a frame once for each N/4 frame, and a subscriber station SS2 (720) listens to a frame once for each N/2 frame.

Therefore, broadcast information which is needed to be listened to by the subscriber states SS1 and SS2 is broadcast once for each N/2 frame, and information which is needed to be transmitted for a specific subscriber station SS1 is broadcast by a subframe with a period of an N/4 frame.

However, the periodic power saving mode is easy to manage, but its power saving efficiency is not good because most of the data traffic is shown at a specific time (i.e., a burst characteristic), and periodic switching to the listening mode is inefficient for power saving in the data communication system such as the Internet.

Since the data traffic other than voice traffic has a burst characteristic and a long-range dependence as described above, it is desirable to exponentially increase the next sleep window when no data traffic in the transmission standby is provided in the listening mode.

As shown in FIG. 8, a subscriber station SS3 initially has a sleep window of an N frame, and it exponentially increases the sleep window such as to 2N, 4N, and 8N.

However, the case of exponentially increasing the sleep window is effective when the data traffic has a long-range dependence, but it increases complexity of the system since it must manage the sleep window and the listening interval for the respective subscriber stations.

Also, the power saving operation method shown in FIG. 8 is not efficient for traffic which has a very long interval and periodically appears.

As to the HIPERLAN/2 system, each SS enters the sleep state with a predetermined sleep window. In this instance, the sleep window is allowed during a frame time corresponding to a value of exponentiation of 2. The frame which corresponds to a listening interval of an SS having a shorter sleep window is superimposed on the frame which corresponds to a listening interval of an SS having a longer sleep window. For example, the listening interval of the SS which is in the sleep mode with the period of eight frames is superimposed on the listening interval of the SS which is in the sleep mode with the period of four frames, which advantageously prevents repetition of management compared to the method of individually managing the listening interval of each SS since the sleep windows of SSs are managed by grouping them.

However, recent transactions have reported that the Internet traffic has a long-range dependence or self-similarity, which represents that the burst characteristic of traffic is stronger and is long-lasting. Therefore, the above-noted method is very efficient when the traffic occurs with a fixed period, but the same may be inefficient when the self-similarity is strong in a like manner of the Internet traffic.

U.S. Pat. No. 5,758,278 (May 26, 1998) entitled "Method and apparatus for periodically reactivating a mobile telephone system clock prior to receiving polling signals" discloses a method which is only applicable to periodical reactivation, and finds an awaking time with less power consumption on the basis of periodicity to thus control the mobile telephone to efficiently awake before periodical polling signals are generated.

The transaction entitled "IEEE 802.16e Sleep Mode" published in IEEE 802.16e Session #24 Contribution, pp. 1 to 8 (Mar. 11, 2003) discloses required improvements to be supported by the IEEE 802.16a standards in order to support the mobility operation by reducing power consumption of the subscriber station. The transaction proposes a scheme for applying a typical burst characteristic of traffic, transmitting no packets in the off period in which no packets are generated to thereby control the subscriber station to be in the sleep mode and reduce power consumption of the subscriber station. In particular, the scheme controls the sleep window to be double and reduces the power consumption of the subscriber station when no traffic is found to be transmitted to the corresponding subscriber station, by considering that the traffic of the Ethernet and the Internet maintains the duration of the traffic when no traffic is provided.

That is, the transaction applies a sleep window update algorithm which uses an exponentially-increasing sleep window to increase the sleep window when no traffic is provided, thereby saving the power. However, the transaction fails to provide a method for grouping the subscriber stations and managing the grouped subscriber stations for the conventional case in which the initial sleep window has no relation to the final sleep window, thus deteriorating the efficiency of management and increasing the size of a signaling message.

The IEEE 802.16e system adopts a concept of exponentially increasing the sleep window in the operation of sleep mode. That is, on entering the sleep mode, the subscriber station checks the traffic during the sleep window, and when no traffic is found to be transmitted to the subscriber station, the subscriber station doubles the next sleep window and enters the sleep mode again.

The above-noted process is allowed in consideration of the self-similarity of Internet traffic, and hence, when no traffic is provided for a predetermined period, it is more probable that no traffic is provided for a longer period, and the efficiency of the sleep mode is increased.

In addition, the process for the subscriber station to enter the sleep mode with the initial sleep window, double the sleep window and enter the next sleep mode when no traffic occurs during the sleep mode is repeated until it comes to the final sleep window. The subscriber station enters the next sleep mode with the final sleep window value when the final sleep window is less than the doubled previous sleep window.

The above-described mechanism may generate the same effect as that of the sleep mode operable by the fixed sleep window when the initial sleep window is established to correspond to the final sleep window. However, the mechanism fails to arrange the listening intervals of the subscriber station operable by the sleep mode, and requires searching the subscriber stations in the sleep state for each frame in order to indicate traffic, and has a problem when a large volume of signaling messages for indication of traffic are applied to a specific frame.

SUMMARY OF THE INVENTION

It is an advantage of the present invention to provide a power saving mode control method and device manageable by a base station and applicable to a sleep mode operation for reducing power consumption in a wireless portable Internet system.

It is another advantage of the present invention to provide a power saving mode control method and device for minimizing overheads of signaling messages for traffic indication to a subscriber station in a wireless portable Internet system.

In one aspect of the present invention, a system for controlling a power saving mode of a subscriber station in a wireless portable Internet system comprises: a message receiver for receiving a sleep request (SLP-REQ) message from the subscriber station; a message parser for parsing the sleep request message and extracting an initial sleep window, a final sleep window, and a subscriber station identifier; a sleep mode controller for determining an entrance time to the sleep mode by the subscriber station which requests the sleep mode according to the initial sleep window, the final sleep window, and the subscriber station identifier so as to group listening intervals of a plurality of subscriber stations and arrange the same; a grouping database for storing information on the sleep modes of the grouped subscriber stations and information on the groups; a sleep mode database for storing the initial sleep windows and the final sleep windows of the grouped subscriber stations; and a message transmitter for notifying the sleep-mode-requested subscriber station of the initial sleep windows, the final sleep windows, and the entrance time to the sleep mode.

The sleep mode controller comprises: a grouping controller for controlling grouping of sleep groups managed by the grouping controller according to the sleep request message parsed by the message parser, and checking which group has the least number of subscriber stations in the sleep mode from among the sleep groups; a subscriber station arranger for arranging the subscriber station to the group with the least number of subscriber stations; and a sleep window determiner for determining an initial sleep window and a final sleep window appropriate for system management, and using the initial sleep window and a final sleep window to manage the corresponding subscriber station.

The system further comprises a frame arranger for controlling a start frame so that the grouped and arranged subscriber station may receive a traffic indication and be arranged to a frame.

The sleep mode controller parses the sleep request message, arranges the subscriber station entering the sleep mode to the group with the least number of subscriber stations, and groups the same.

The sleep mode controller determines the initial and final sleep windows, uses the same to manage the subscriber station, and uses the same as parameters of a sleep response message to transmit the parameters to the subscriber station.

The sleep mode controller determines the initial and final sleep windows of the subscriber station so that listening intervals for each group may not be superimposed.

The sleep mode controller applies notification on the traffic existence in the subscriber stations in the sleep mode to the respective groups so as to minimize the amount of information on signaling messages when indicating the traffic to the subscriber station in the sleep mode.

The initial sleep window value is a value when the subscriber station enters the sleep mode, and is integer-times the minimum initial sleep window value controlled by the base station.

The final sleep window value is a maximum window in which the subscriber station enters the sleep state once while in the operation of sleep mode, and is integer-times the minimum initial sleep window value.

The number of sleep groups controlled by the sleep mode controller is not greater than the minimum initial sleep window value based on the number of frames, and the base station assigns the subscriber station to one of sleep groups controlled by the base station.

The sleep mode controller controls a start frame so that the sleep group to which the subscriber station is assigned may be arranged to the frame for receiving a traffic indication.

N sleep groups are controlled by the sleep mode controller, a frame having a remainder of k (Frame_Number MOD N=k) generated by dividing the number of frames by N is controlled to be the start frame so as to assign a specific subscriber station to the k-th group.

In another aspect of the present invention, a method for controlling a power saving mode in a wireless portable Internet system, comprises: (a) controlling a subscriber station in the awake mode to detect that the service provided to the subscriber station has no uplink data or downlink data for more than a predetermined time; (b) controlling the subscriber station to use a characteristic of the service and transmit a sleep request message to which parameters are established to the base station; (c) receiving a sleep response message including an initial sleep window, a final sleep window, and a start frame from the base station; (d) establishing parameters for the operation of sleep mode according to parameters provided in the sleep response message; and (e) allowing the subscriber station to enter the sleep mode.

The initial sleep window value is a value when the subscriber station enters the sleep mode, and is integer-times the minimum initial sleep window value controlled by the base station.

The final sleep window value is a maximum window in which the subscriber station enters the sleep state once while in the operation of sleep mode, and is integer-times the minimum initial sleep window value.

The number of sleep groups is not greater than the minimum initial sleep window value based on the number of frames, and the base station assigns the subscriber station to one of sleep groups controlled by the base station.

A start frame is controlled so that the sleep group to which the subscriber station is assigned may be arranged to the frame for receiving a traffic indication.

In still another aspect of the present invention, a method for controlling a power saving mode in a wireless portable Internet system comprises: (a) receiving a sleep request message from a subscriber station; (b) determining an initial sleep window and a final sleep window of the subscriber station; (c) using the initial sleep window and the final sleep window and determining an entrance time to the sleep mode so as to arrange a listening interval of the sleep-mode-requested subscriber station and listening intervals of other subscriber stations and group the subscriber stations; and (d) transmitting a sleep response message including the initial sleep window, the final sleep window, and a start frame to the subscriber station.

In still yet another aspect of the present invention, a method for processing traffic indication in a power saving mode of a subscriber station in a wireless portable Internet system comprises: (a) accessing a frame for processing traffic indication of a predetermined sleep group, and checking which subscriber station's sleep window is expired from among the subscriber stations configuring the group; (b) checking whether subscriber stations have data to be transmitted; (c) controlling a base station to establish an indicator for traffic indication to the corresponding subscriber station when the data are found in the subscriber station; (d) transmitting a traffic indication message when the subscriber stations belonging to the group are checked and the indicator is established; and (e) detecting the subscriber stations to be in the awake mode, the subscriber stations having established the indicator indicating that the subscriber stations have the data.

The method further comprises: updating the sleep window corresponding to the subscriber station, and entering a state in which the subscriber station is in the sleep mode when no data are found in the subscriber station.

The indicator includes a bitmap method and an identifier list of subscriber stations.

According to the present invention, a large amount of traffic indication messages or paging messages for awaking a subscriber station when downlink traffic is generated to the subscriber station in the sleep mode are not provided to a specific frame by establishing the number of subscriber stations entering the sleep mode to be constant, and in addition, system management, system complexity, and processing loads are reduced by grouping the subscriber stations entering the sleep mode, and the existence state of traffic to the subscriber station is notified with a lesser amount of information (overloads).

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
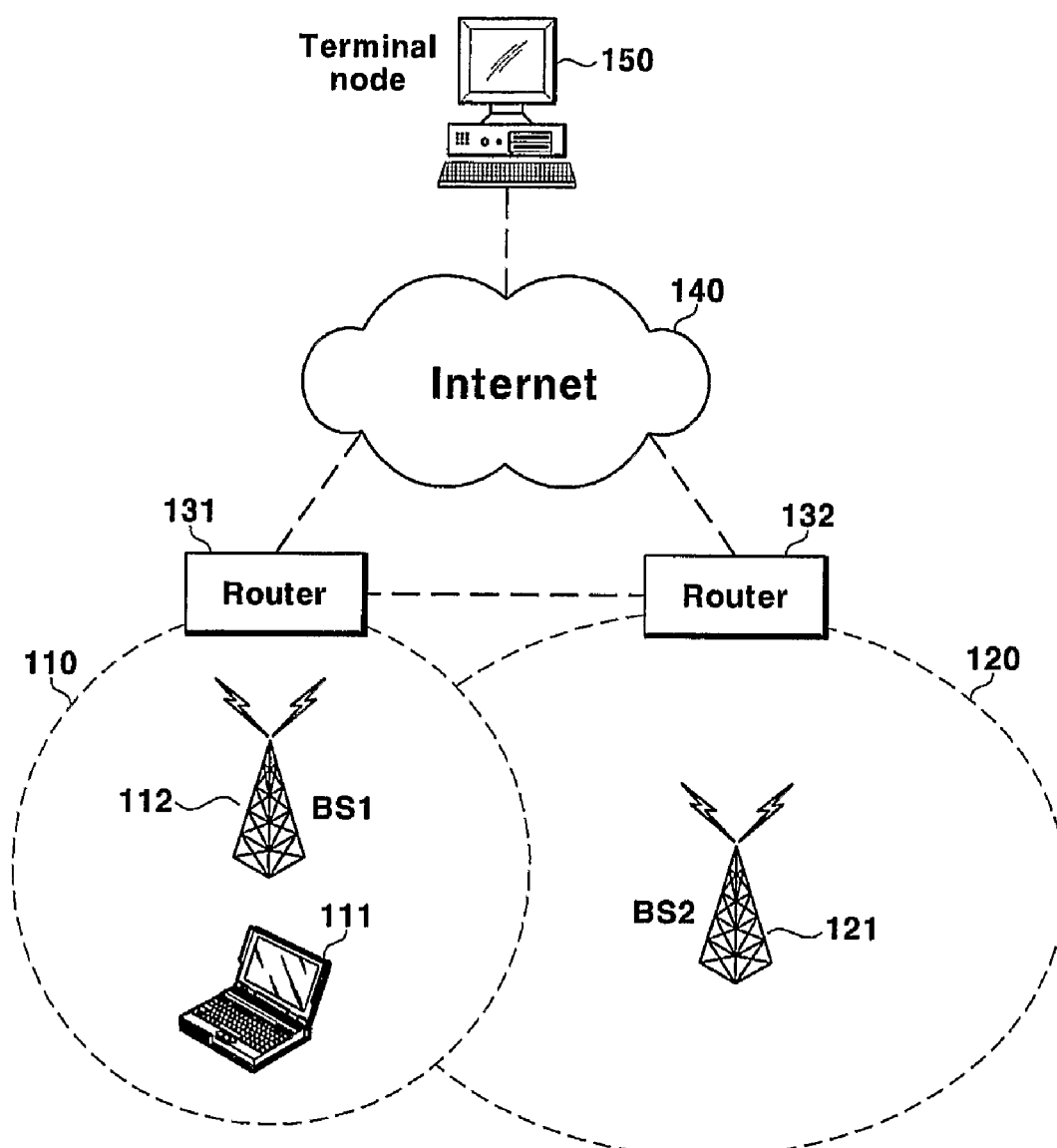
FIG. 1 shows a diagram of the wireless portable Internet system.
Figure 2:
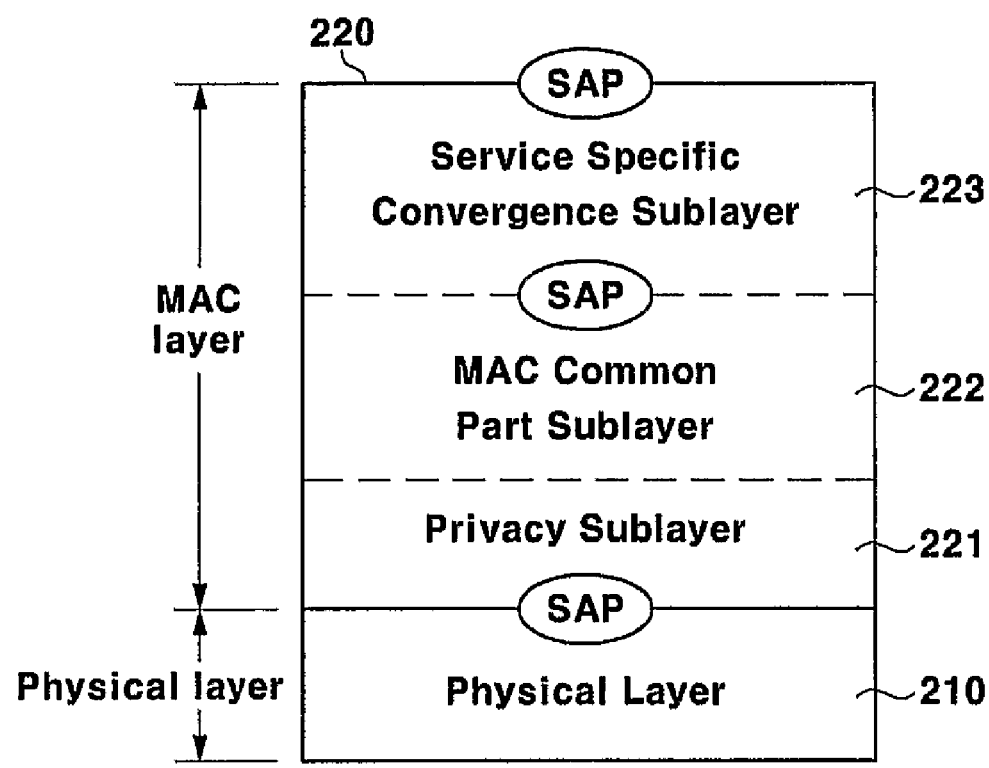
FIG. 2 shows a hierarchical structure of the wireless portable Internet system.
Figure 3:
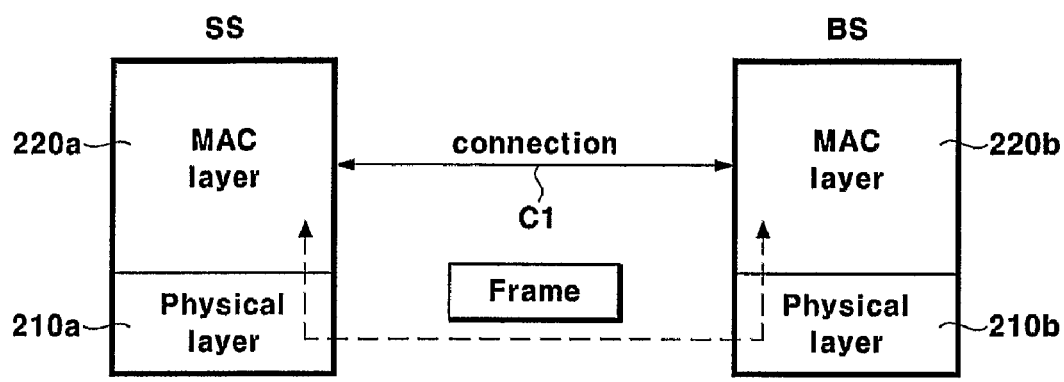
FIG. 3 shows a diagram of a connection configuration between a base station and a subscriber station in the wireless portable Internet system.
Figure 4:
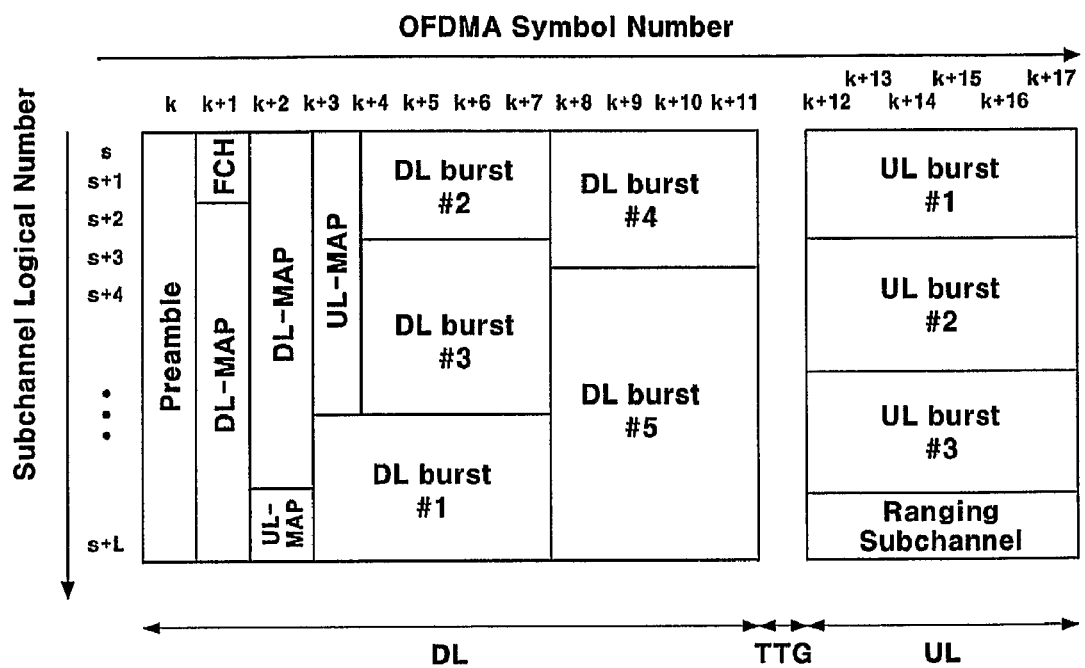
FIG. 4 shows a diagram for a frame structure of the wireless portable Internet system.
Figure 5:
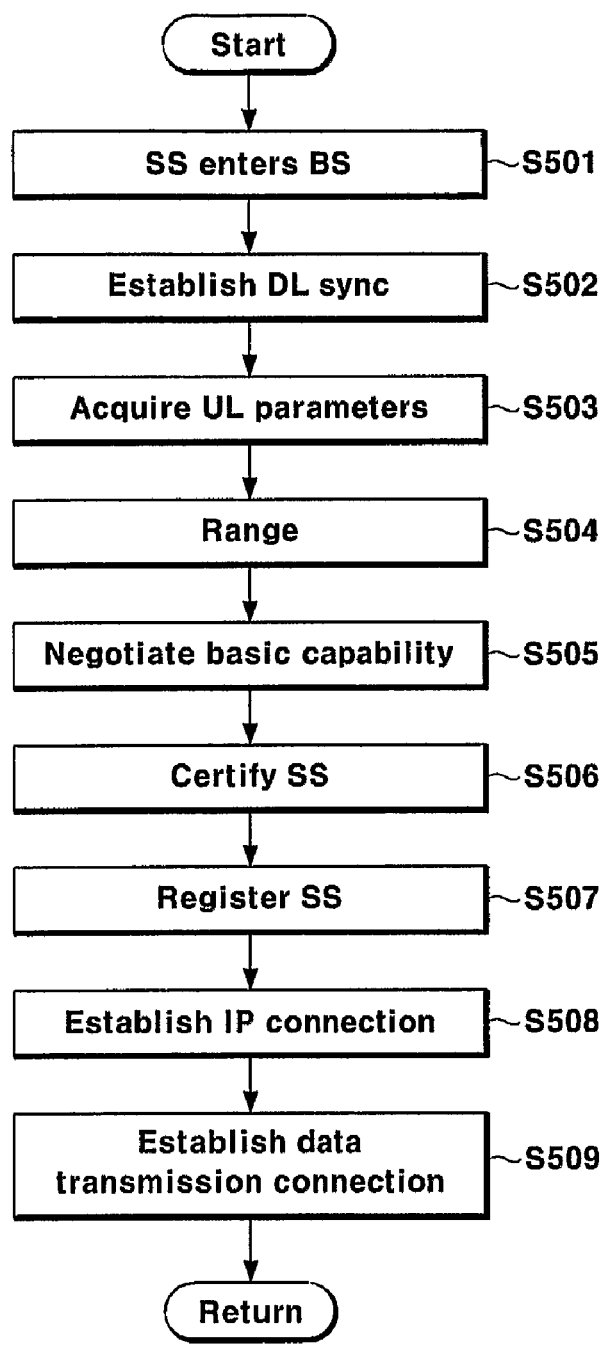
FIG. 5 shows a flowchart for establishing a connection process in the wireless portable Internet system.
Figure 6:
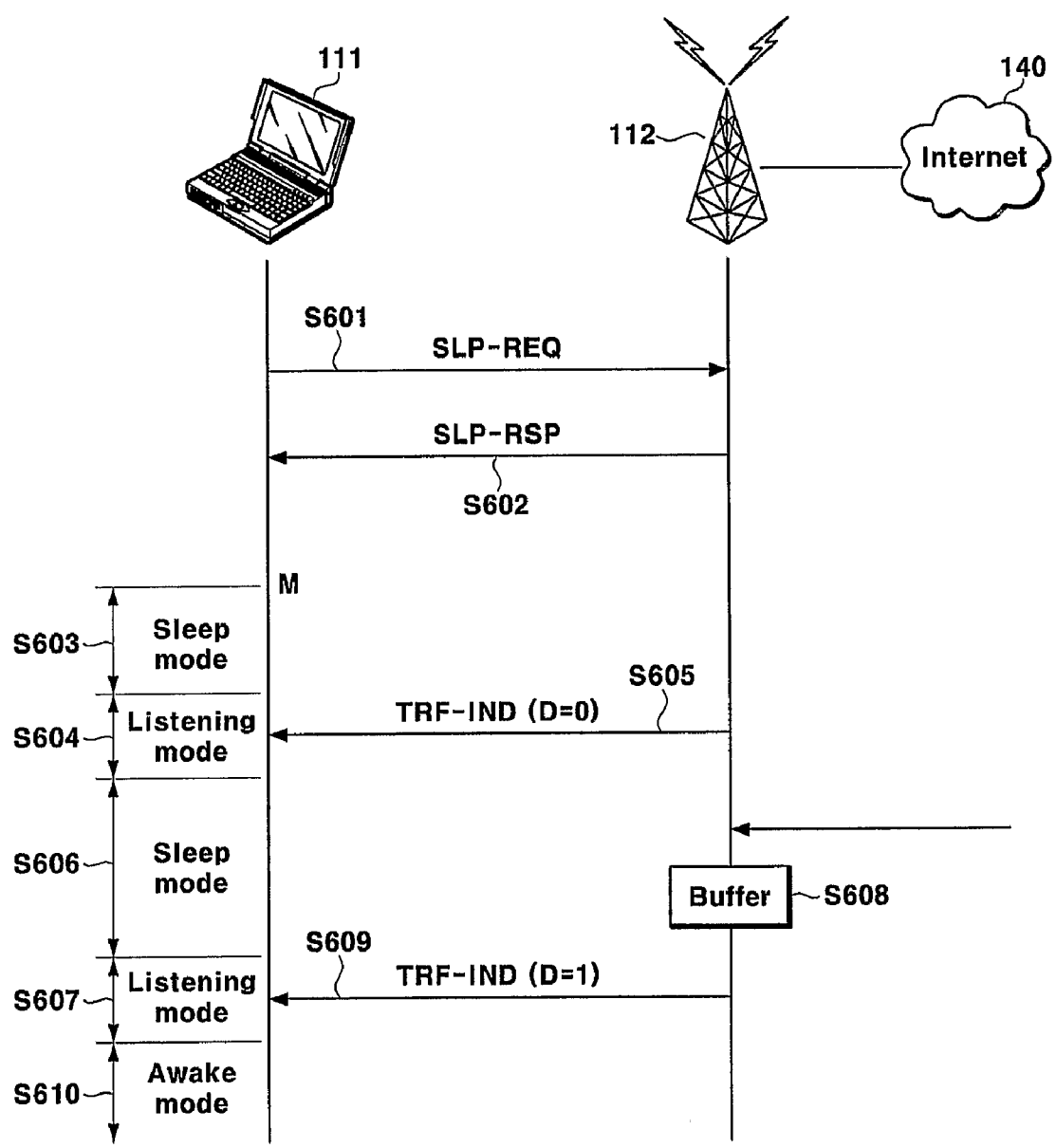
FIG. 6 shows a signal flowchart for a sleep mode operation in the wireless portable Internet system.
Figure 7:
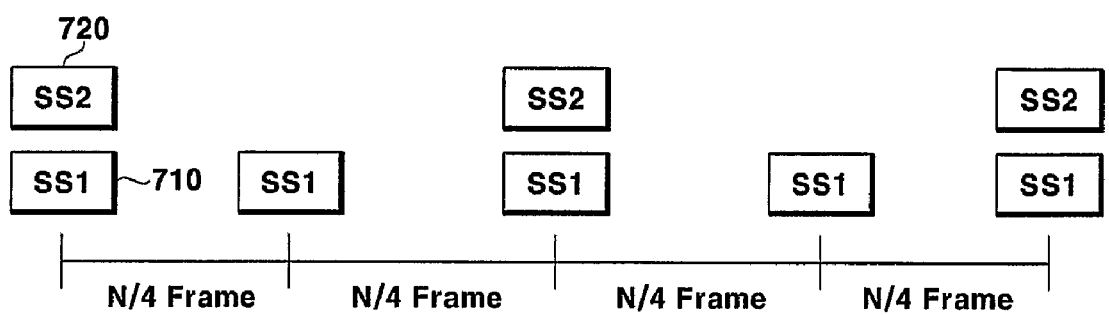
FIGS. 7 and 8 show conventional sleep windows in the sleep mode.
Figure 8:
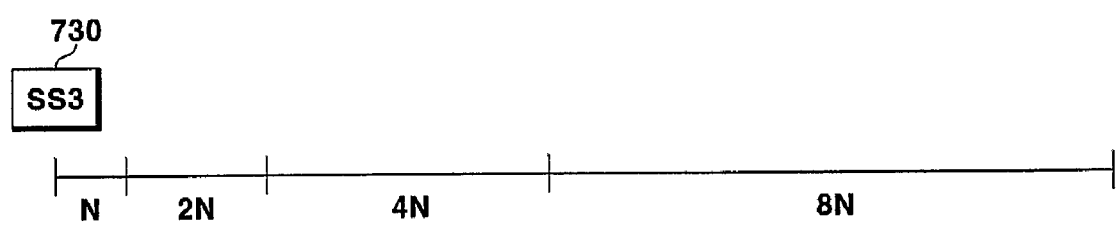

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which same descriptions are provided have the same reference numerals.

With reference to drawings, a power-saving mode control method and device in a wireless portable Internet system according to an exemplary embodiment of the present invention will be described.

Figure 9:
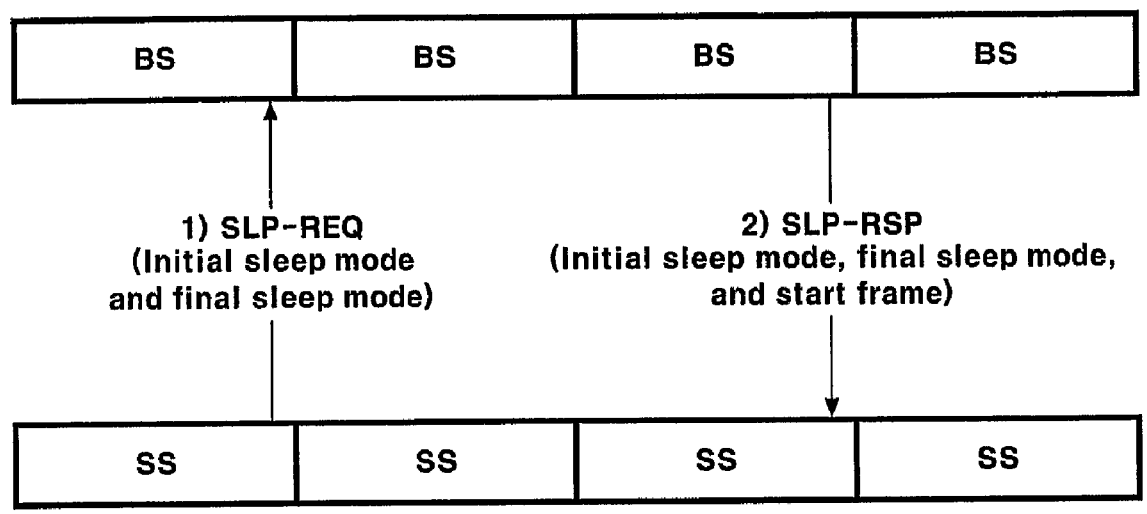
FIG. 9 shows a request and response process for entering a power saving mode (a sleep mode) according to an exemplary embodiment of the present invention.

FIG. 9 shows a request and response process for entering a power saving mode (a sleep mode) according to an exemplary embodiment of the present invention where time is passed in the horizontal direction.

The subscriber station (SS) transmits a sleep request (SLP-REQ) 22, message to the base station so as to enter the sleep mode. In detail, when no data are provided in the uplink and the downlink for a predetermined time frame, the subscriber station transmits a SLP-REQ message to the base station to enter the sleep mode. The condition for entering the sleep mode is not restricted by the exemplified application of SLP-REQ message, and other conditions are also applicable.

Parameters of the SLP-REQ message include an initial sleep window and a final sleep window. The subscriber station can request a desired condition of entrance to the sleep mode with a predetermined initial sleep window and a predetermined final sleep window from the corresponding base station according to features of services.

When receiving the SLP-REQ message, the base station detects which group has the least number of subscriber stations in the sleep mode from among a plurality of sleep groups controlled by the base station, and assigns the corresponding subscriber station to the corresponding group.

Also, when receiving the SLP-REQ message, the base station determines an initial sleep window and a final sleep window appropriate for system management, uses the sleep windows to manage the corresponding subscriber station, uses the sleep windows as parameters for a sleep response (SLP-RSP) message, and transmits the parameters to the corresponding subscriber station. In this instance, the base station determines parameters for a sleep mode operation of the corresponding subscriber station according to the following conditions.

1) The initial sleep window is an initial sleep window value when the corresponding subscriber station enters the sleep mode, and allows integer-times the minimum initial sleep window managed by the base station. For example, when the minimum initial sleep window is given to be 4, the initial sleep window can be one of 4, 8, 12, ..., 4N (N is an integer).

2) The final sleep window is a maximum sleep window when the corresponding subscriber station enters the sleep state once in the sleep mode, and allows integer-times the minimum initial sleep window managed by the base station. For example, when the minimum initial sleep window is given to be 4, the final sleep window can be one of 4, 8, 12, ..., 4N (N is an integer).

3) The number of sleep groups controlled by the base station is not greater than the minimum initial sleep window based on the number of frames, and the base station assigns a corresponding subscriber station to one of the sleep groups and controls a start frame value so that the sleep group may be assigned to the frame for receiving a traffic indication (TRF-IND). For example, when the minimum initial sleep window has a value of 4, the number of sleep groups is allowed to be up to 4.

When four sleep groups G0, G1, G2, and G3 managed by the base station are provided and the subscriber station is assigned to Group 2, it is possible to control the number of frames at which the subscriber station enters the sleep mode to be a predetermined number of frames which satisfy the condition in which the remainder generated by dividing the number of frames by 4 is given to be 2. That is, the number of frames at which the subscriber station enters the sleep mode is given to be 2, 6, ..., 4N+2 (N is an integer). For example, when N sleep groups managed by the base station are given, it is allowed to control the frame having the remainder of k (Frame_Number MOD N=k) to be the start frame of the sleep mode of the subscriber station in order to allocate a specific subscriber station to the k-th group, where the remainder of k is generated by dividing the number of frame by N, and the number of start frames is given to be 2.

In this case, since the base station has the number of subscriber stations belonging to the sleep groups, it is possible to assign in advance the subscriber station which requests entrance to the sleep mode to the group with the least number of subscriber stations so that the subscriber stations may be uniformly provided to the groups.

Figure 10:
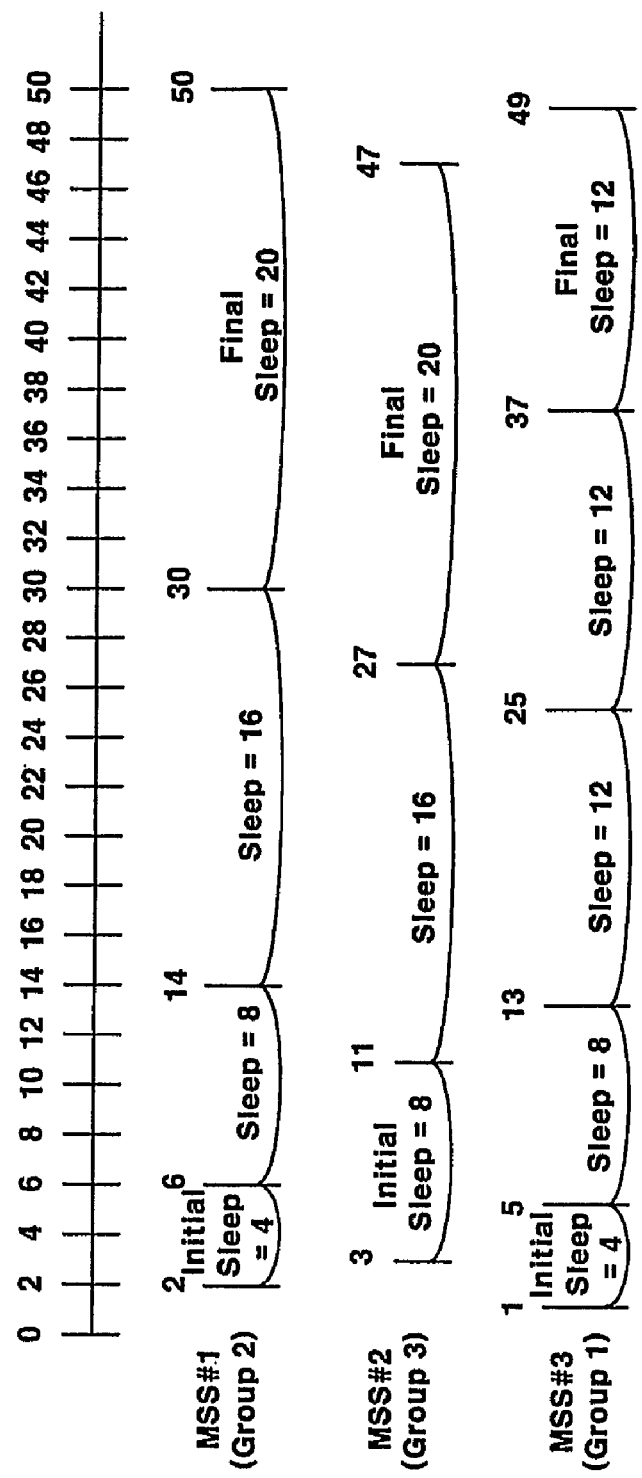
FIG. 10 shows a method for grouping subscriber stations entering a power saving mode (a sleep mode) according to an exemplary embodiment of the present invention.

FIG. 10 shows a method for grouping subscriber stations entering a power saving mode (a sleep mode) according to an exemplary embodiment of the present invention, illustrating that no sleep groups are superimposed with each other when keeping the above-noted conditions 1), 2), and 3).

Referring to FIG. 10, MSS#1 is the subscriber station which has the initial sleep window of 4 and the final sleep window of 20 and is assigned to Group 2, MSS#2 is the subscriber station which has the initial sleep window of 8 and the final sleep window of 20 and is assigned to Group 3, and MSS#3 is the subscriber station which has the initial sleep window of 4 and the final sleep window of 12 and is assigned to Group 1. Sleep mode parameters for the respective subscriber stations satisfy the above conditions as follows.

1) The initial sleep window value allows integer-times the minimum initial sleep window value managed by the corresponding base station. That is, the subscriber station has the values of 4 (MSS#1 and MSS#3) and 8 (MSS#2) when the minimum initial sleep window is defined to be 4.

2) The final sleep window value allows integer-times the initial sleep window value. That is, the subscriber station MSS#3 has the value of 12 (three times the minimum initial sleep window), and the subscriber stations MSS#1 and MSS#2 have the value of 20 (five times the minimum initial sleep window).

3) The base station assigns a subscriber station to one of sleep groups managed by the base station and controls a start frame so that the sleep groups may be aligned to the frame for receiving a TRF-IND. That is, the start frame number of 2 is assigned to the subscriber MSS#1 belonging to Group 2, the start frame number of 3 is assigned to the subscriber MSS#2 belonging to Group 3, and the start frame number of 1 is assigned to the subscriber MSS#3 belonging to Group 1.

For each of the subscriber stations MSS#1, MSS#2, and MSS#3, the listening period (i.e., a frame which has a sleep window to be expired) of the group to which the subscriber station belongs is located within the group to which the subscriber station belongs.

Therefore, when the subscriber stations are established to satisfy the conditions, the subscriber stations in the sleep mode respectively process the groups classified by the base station and notify the traffic, and hence, processing loads and overheads caused by the notification of traffic are reduced to be those of 1/(number of groups) compared to prior art having no group allocation.

Figure 11:
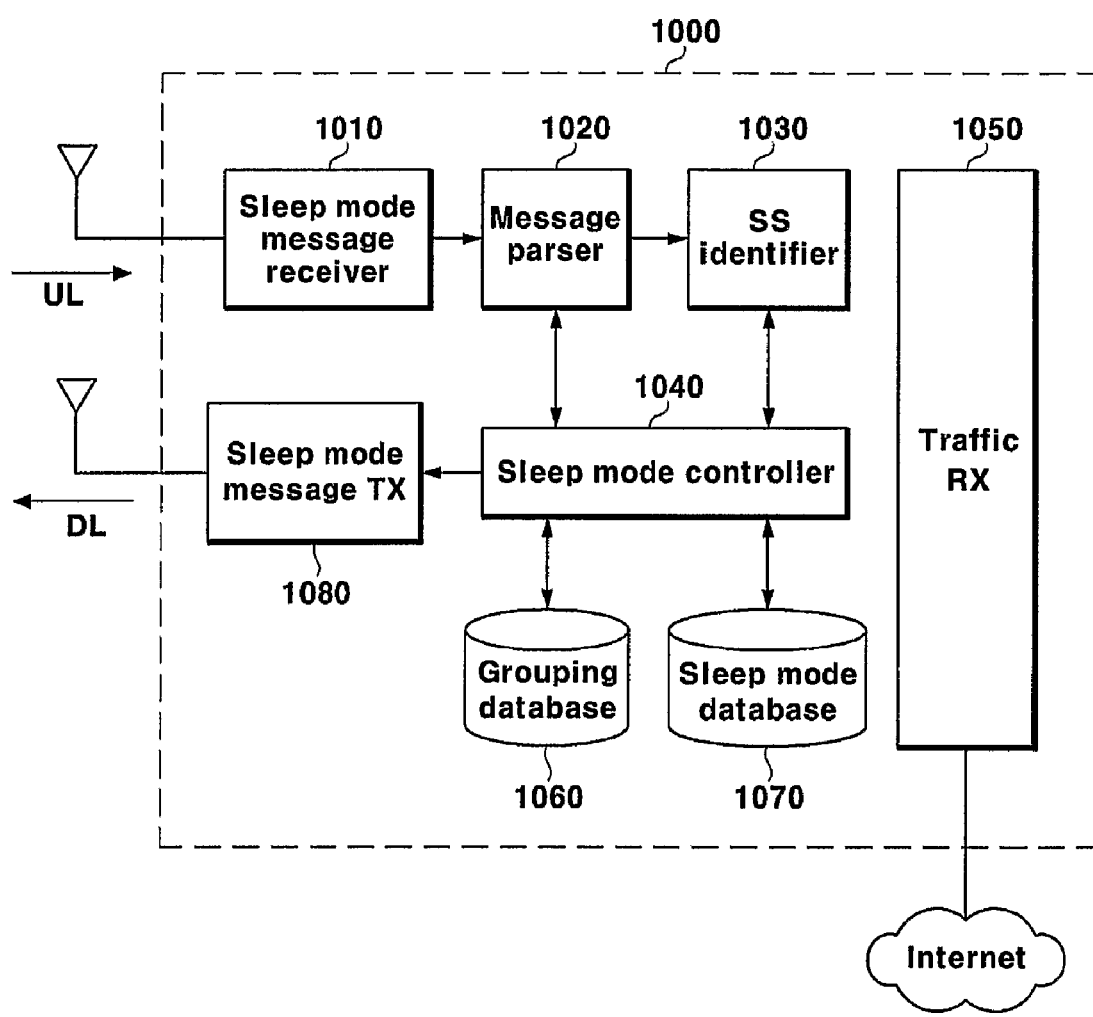
FIG. 11 shows a block diagram of a power-saving mode control system according to an exemplary embodiment of the present invention.

FIG. 11 shows a block diagram of a power-saving mode control system according to an exemplary embodiment of the present invention. The power-saving mode control system can be realized to a base station which manages subscriber stations and can apply the existing components which control the power saving mode of the wireless portable Internet system.

As shown, the power-saving mode control system includes a sleep mode message receiver 1010, a message parser 1020, a subscriber station identifier 1030, a sleep mode controller 1040, a traffic receiver 1050, a grouping database 1060, a sleep window database 1070, and a sleep mode message transmitter 1080.

The sleep mode message receiver 1010 receives a SLP-REQ from a subscriber station.

The message parser 1020 parses the SLP-REQ, extracts a subscriber station identifier, an initial sleep window, and a final sleep window therefrom, and transmits the same to the sleep mode controller 1040 and the subscriber station identifier 1030.

The sleep mode controller 1040 controls grouping of the sleep groups managed by the sleep mode controller 1040 according to the SLP-REQ parsed by the message parser 1020, and in this instance, the subscriber station which has requested the entrance to the sleep mode can be assigned to the group with a lesser number of subscriber stations in advance. Also, the sleep mode controller 1040 uses the subscriber station identifier, the initial sleep window, and the final sleep window to control the subscriber station's entrance time to the sleep mode.

The sleep window database 1070 stores information on the initial sleep windows and the final sleep windows for the respective subscriber stations.

When the subscriber station is grouped together with other subscriber stations according to the control of entrance time to the sleep mode, the grouping information is stored in the grouping database 1060 and is updated according to a sleep mode request by the subscriber station.

When the entrance time to the sleep mode is determined by the sleep mode controller 1040, the sleep mode message transmitter 1080 transmits a medium access control (MAC) message (e.g., an SLP-RSP) including the initial sleep window, the final sleep windows, and the entrance time to the sleep mode to the subscriber station in response to the sleep mode request.

The traffic receiver 1050 receives traffic information through the Internet, and establishes an indicator for traffic indication to the subscriber station so that the sleep mode controller 1040 may switch the subscriber station having entered the sleep mode into the awake mode, and the traffic receiver 1050 also transmits the TRF-IND message to the subscriber station through a traffic transmitter (not illustrated).

Figure 12:
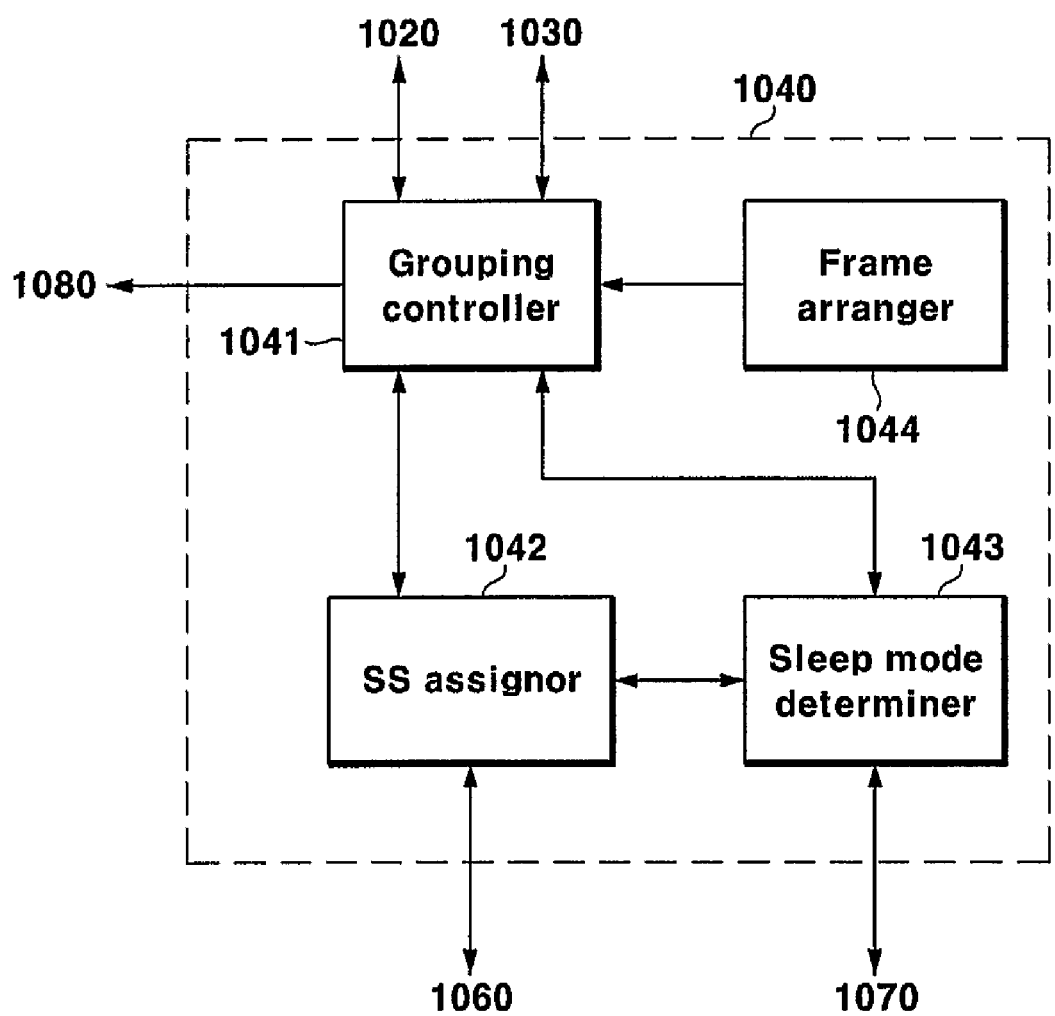
FIG. 12 shows a block diagram of a sleep mode controller of a power-saving mode control system according to an exemplary embodiment of the present invention.

FIG. 12 shows a block diagram of a sleep mode controller of a power-saving mode control system according to an exemplary embodiment of the present invention.

As shown, the sleep mode controller includes a grouping controller 1041, a subscriber station assigner 1042, a sleep window determiner 1043, and a frame arranger 1044.

The grouping controller 1041 controls grouping of the sleep groups managed by the grouping controller 1041 according to the SLP-REQ message parsed by the message parser 1020, and identifies the subscriber station parsed by the subscriber station identifier 1030.

The subscriber station assigner 1042 assigns a subscriber station to the group with a lesser number of subscriber stations in advance in consideration of the number of subscriber stations, and stores the assignment data in the grouping database 1060.

In detail, the message parser 1020 parses the SLP-REQ message, extracts a subscriber station identifier, an initial sleep window, and a final sleep window therefrom, and provides the same to the grouping controller 1041, and the grouping controller 1041 checks which group has the least number of subscriber stations in the sleep mode from among the sleep groups managed by the grouping controller 1041, and the subscriber station assigner 1042 assigns the corresponding subscriber station to the checked group.

The sleep window determiner 1043 determines the initial and final sleep windows appropriate for system management, uses the same to the management of the corresponding subscriber station, stores the same in the sleep window database 1070, and transmits the same to the subscriber station as parameters of the SLP-RSP message.

The frame arranger 1044 controls the start frame so that the subscriber station of the designated sleep group may receive the TRF-IND and be arranged to the frame.

Figure 13:
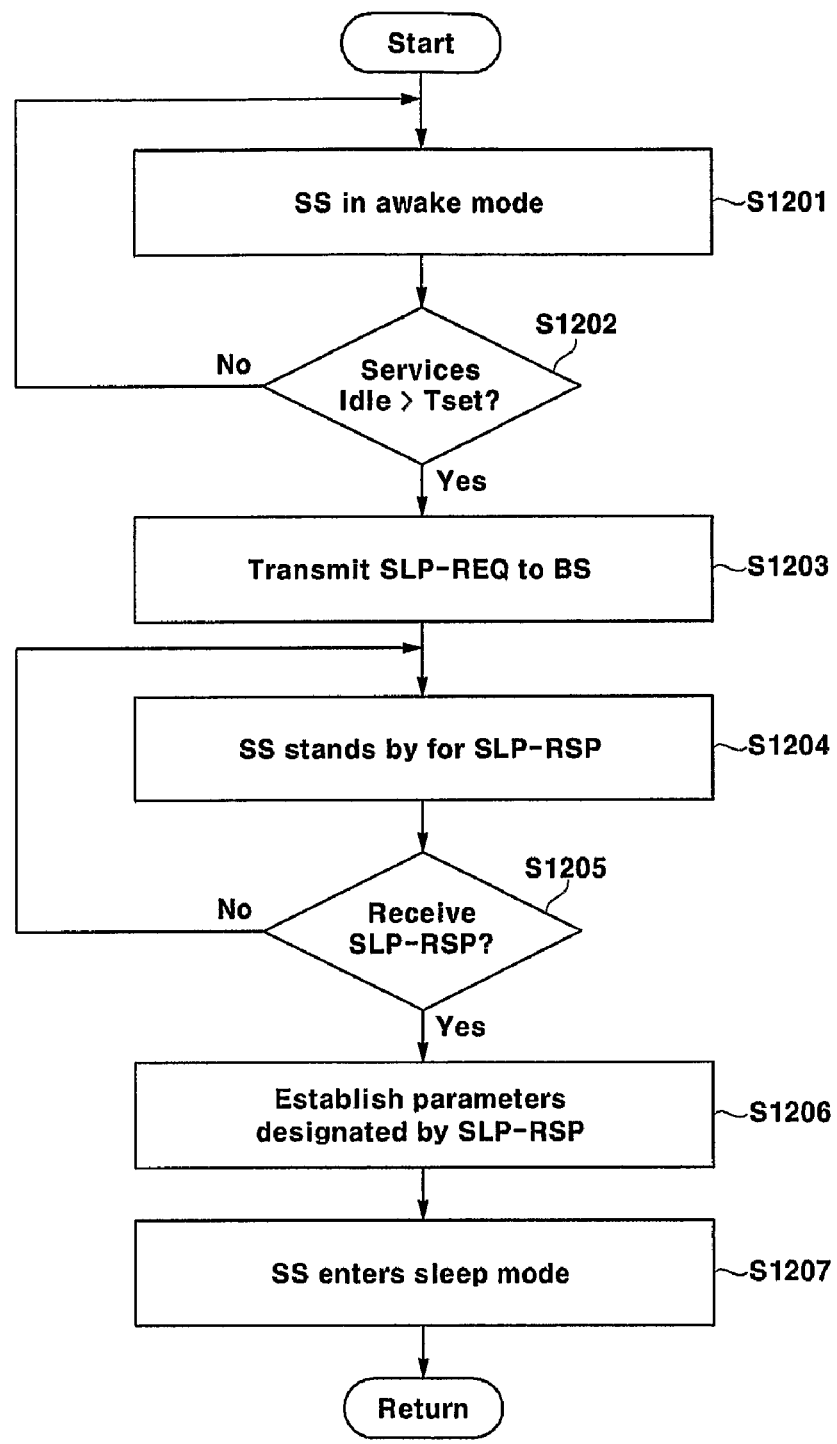
FIG. 13 shows a flowchart of a power saving mode (a sleep mode) by a subscriber station according to an exemplary embodiment of the present invention.

FIG. 13 shows an operational flowchart of a power saving mode (a sleep mode) by a subscriber station according to an exemplary embodiment of the present invention.

Referring to FIG. 13, a process for a normal entrance to the sleep mode excluding an exceptional case such as rejection of entrance is shown.

The subscriber station is in the awake state in step S1201.

When the subscriber station detects no uplink or downlink data in the service provided to the subscriber station for more than a predetermined time Tset in step S1202, the subscriber station uses the characteristic of the service, transmits an SLP-REQ message with established parameters to the base station in step S1203, and stands by for an SLP-RSP message in step S1204.

When receiving the SLP-RSP message in step S1205, the subscriber station establishes parameters for sleep mode operation according to the parameters designated in the SLP-RSP message in step S1206, and enters the sleep mode in step S1207. In this instance, the parameters designated in the SLP-RSP message include an initial sleep window and a final sleep window determined by the above-described conditions 1), 2), and 3). Therefore, when a start frame is established, the sleep window increases to the final sleep window from the initial sleep window, and the final sleep window state is then maintained.

Figure 14:
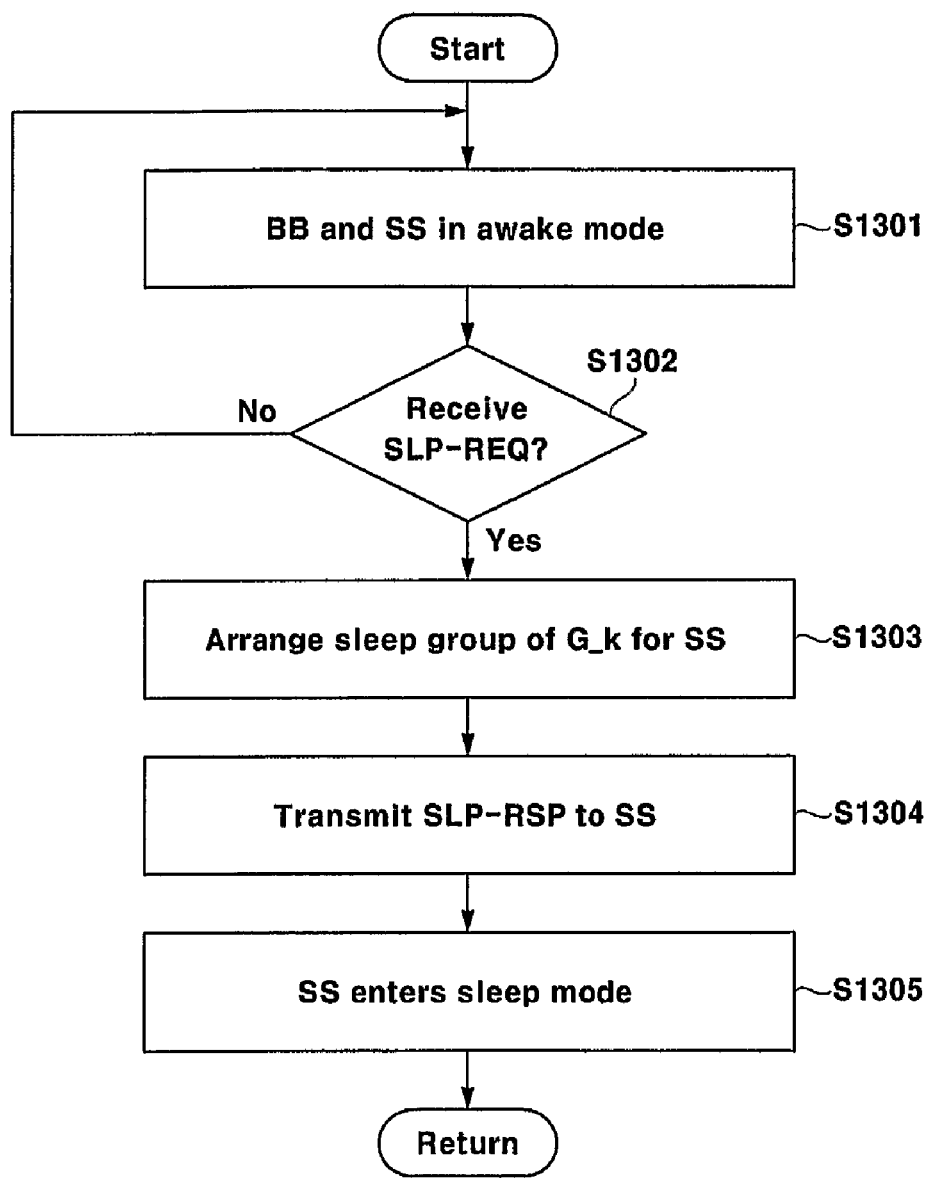
FIG. 14 shows a flowchart of a power saving mode (a sleep mode) by a base station according to an exemplary embodiment of the present invention.

FIG. 14 shows a flowchart of a power saving mode (a sleep mode) by a base station according to an exemplary embodiment of the present invention. In this instance, the process of normal entrance to the sleep mode is exemplified, and no exceptional case will be described.

Referring to FIG. 14, the base station detects that a predetermined subscriber station is in the BS-SS awake mode in step S1301. When receiving an SLP-REQ message from the subscriber station while in the awake mode in step S1302, the base station uses the number of subscriber stations configuring the sleep groups managed by the base station, and assigns a sleep group for the subscriber station in step S1303. For example, when four groups are provided such that Group 0 has 32 subscriber stations, Group 1 has 30 subscriber stations, Group 2 has 25 subscriber stations, and Group 3 has 31 subscriber stations, the base station assigns the sleep group of the subscriber station to Group 2.

The base station transmits an SLP-RSP message to the corresponding subscriber station in step S1304, and enters a BS-SS sleep mode in step S1305, and the parameters of the SLP-RSP message are determined according to the three conditions.

As described above, 1) the initial sleep window value allows integer-times the minimum initial sleep window value managed by the base station, 2) the final sleep window value allows integer-times the minimum initial sleep window value, and 3) the number of sleep groups managed by the base station is established to be not greater than the frame-based minimum initial sleep window value, the base station assigns the subscriber station to one of sleep groups controlled by the base station and controls the start frame so that the sleep group to which the subscriber station is designated may be arranged to the frame which receives the TRF-IND as previously shown in FIG. 10.

Figure 15:
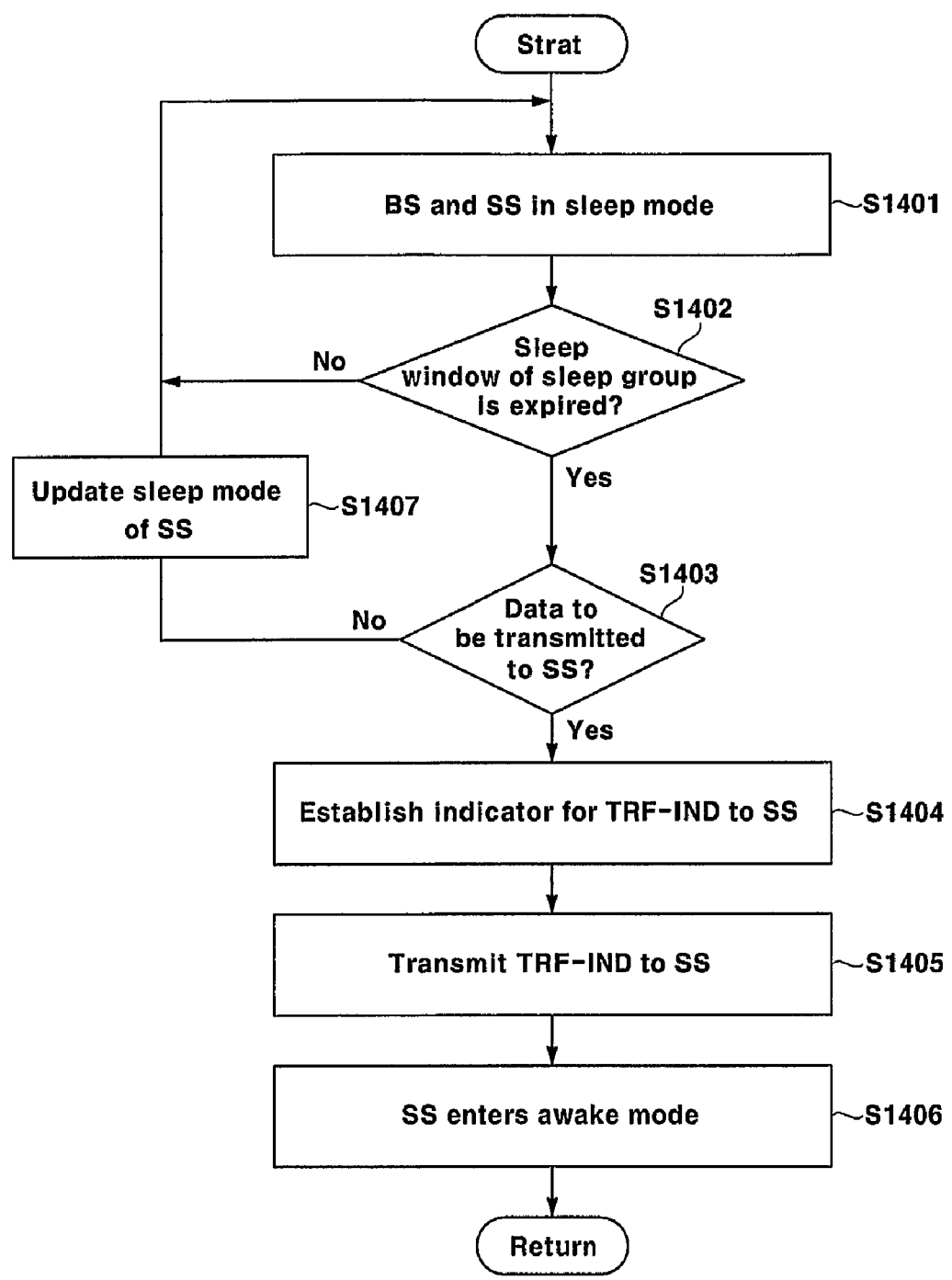
FIG. 15 shows a flowchart for processing traffic indication (TRF-IND) of a predetermined sleep mode group according to an exemplary embodiment of the present invention.

FIG. 15 shows a flowchart for processing traffic indication (TRF-IND) of a predetermined sleep mode group according to an exemplary embodiment of the present invention.

Referring to FIG. 15, when the base station reaches the frame in which the base station processes the TRF-IND of a specific sleep group in step S1401, for example, when the base station reaches the frame number of 0 (i.e., Group 0) which is the remainder generated by dividing the frame numbers by 4, the base station checks the sleep window of which subscriber station is expired from among the subscribers configuring the group in step S1402. In this instance, no processing time is considered.

The base station checks whether data to be transmitted to the subscriber station are provided in step S1403, and when no data to be transmitted thereto are found, the base station updates the sleep window corresponding to the subscriber station in step S1407, and enters the BS-SS sleep mode in step S1401.

When the data are found, the base station establishes an indicator for traffic indication to the subscriber station in step S1404, and the indicator includes the bitmap method and the method of having an identifier list of subscriber stations.

When the subscriber stations belonging to the group are checked and the indicator is established, the base station transmits a TRF-IND message to the subscriber station in step S1405, and the subscriber stations with the indicator indicating the existence of data enter the awake mode in step S1406.

Accordingly, the base station and the subscriber stations can operate and process the sleep mode and notify traffic with the minimized overheads.

The subscriber stations entering the sleep mode are grouped, the number of subscriber stations belonging to each group becomes constant, the listening intervals of subscriber stations for each group are not superimposed, and hence, the overheads of notification signaling messages on the existence of traffic in the subscriber station in the sleep mode are reduced to 1/(number of groups) overheads compared to the conventional ungrouping method.

In addition, notification of traffic existence in the subscriber station in the sleep mode is independently applicable to each group, and the overheads of signaling messages are minimized when notifying the traffic of the subscriber station in the sleep mode.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A system for controlling a power saving mode of a subscriber station in a wireless portable Internet system, the system comprising:
    a message receiver for receiving a sleep request message from the subscriber station;
    a message parser for parsing the sleep request message and extracting an initial sleep window that is an initial sleep window value when the subscriber station enters a sleep mode, a final sleep window that is a maximum sleep window when the subscriber station enters the sleep mode, and a subscriber station identifier;
    a sleep mode controller for determining an entrance time to the sleep mode by the subscriber station which requests the sleep mode according to the initial sleep window, the final sleep window, and the subscriber station identifier for group listening intervals of a plurality of subscriber stations;
    a grouping database for storing information on sleep modes of the grouped subscriber stations and information on the grouped subscriber stations;
    a sleep mode database for storing initial sleep windows and final sleep windows of the grouped subscriber stations; and a message transmitter for notifying the sleep-mode-requested subscriber station of the initial sleep windows, the final sleep windows, and the entrance time to the sleep mode.

2. The system of claim 1, wherein the sleep mode controller comprises:
  a grouping controller for controlling grouping of sleep groups managed by the grouping controller according to the sleep request message parsed by the message parser, and checking which group has the least number of subscriber stations in the sleep mode from among the sleep groups;
  a subscriber station arranger for arranging the subscriber station to the group with the least number of subscriber stations; and
  a sleep window determiner for determining an initial sleep window and a final sleep window appropriate for system management, and using the initial sleep window and a final sleep window to manage the corresponding subscriber station.

3. The system of claim 1, further comprising a frame arranger for controlling a start frame so that the grouped and arranged subscriber stations may receive a traffic indication and be arranged to a frame.

4. The system of claim 1, wherein the sleep mode controller parses the sleep request message, arranges the subscriber station entering the sleep mode to the group with the least number of subscriber stations, and groups the same.

5. The system of claim 1, wherein the sleep mode controller determines the initial and final sleep windows, uses the same to manage the subscriber station, and uses the same as parameters of a sleep response message to transmit the parameters to the subscriber station.

6. The system of claim 1, wherein the sleep mode controller determines the initial and final sleep windows of the subscriber station so that listening intervals for each group may not be superimposed.

7. The system of claim 1, wherein the sleep mode controller applies notification on the traffic existence in the subscriber stations in the sleep mode to the respective groups so as to minimize the amount of information on signaling messages when indicating the traffic to the subscriber station in the sleep mode.

8. The system of claim 1, wherein the initial sleep window value is a value when the subscriber station enters the sleep mode, and is integer-times the minimum initial sleep window value controlled by the base station.

9. The system of claim 1, wherein the final sleep window value is the maximum window in which the subscriber station enters the sleep state once while in the operation of sleep mode, and is integer-times the minimum initial sleep window value.

10. The system of claim 1, wherein the number of sleep groups controlled by the sleep mode controller is not greater than the minimum initial sleep window value based on the number of frames, and the base station assigns the subscriber station to one of sleep groups controlled by the base station.

11. The system of claim 10, wherein the sleep mode controller controls a start frame so that the sleep group to which the subscriber station is assigned may be arranged to the frame for receiving a traffic indication.

12. The system of claim 11, wherein when N sleep groups are controlled by the sleep mode controller, a frame having a remainder of k (Frame_Number MOD N=k) generated by dividing the number of frames by N is controlled to be the start frame so as to assign a specific subscriber station to the k-th group.

13. A method for controlling a power saving mode in a wireless portable Internet system, the method comprising:
  (a) controlling a subscriber station in an awake mode to detect that a service provided to the subscriber station has no uplink data or downlink data for more than a predetermined time;
  (b) controlling the subscriber station to use a characteristic of the service and transmit a sleep request message to which parameters are established to a base station;
  (c) receiving a sleep response message including an initial sleep window that is an initial sleep window value when the subscriber station enters a sleep mode, a final sleep window that is a maximum sleep window when the subscriber station enters the sleep mode, and a start frame from the base station;
  (d) establishing parameters for sleep mode operation according to parameters provided in the sleep response message; and
  (e) allowing the subscriber station to enter the sleep mode.

14. The method of claim 13, wherein the initial sleep window value is a value when the subscriber station enters the sleep mode, and is integer-times the minimum initial sleep window value controlled by the base station.

15. The method of claim 13, wherein the final sleep window value is the maximum window in which the subscriber station enters the sleep state once while in the operation of sleep mode, and is integer-times the minimum initial sleep window value.

16. The method of claim 13, wherein the number of sleep groups is not greater than the minimum initial sleep window value based on the number of frames, and the base station assigns the subscriber station to one of sleep groups controlled by the base station.

17. The method of claim 16, wherein a start frame is controlled so that the sleep group to which the subscriber station is assigned may be arranged to the frame for receiving a traffic indication.

18. A method for controlling a power saving mode in a wireless portable Internet system, the method comprising:
  (a) receiving a sleep request message from a subscriber station;
  (b) determining an initial sleep window that is an initial sleep window value when the subscriber station enters a sleep mode and a final sleep window that is a maximum sleep window when the subscriber station enters the sleep mode of the subscriber station;
  (c) using the initial sleep window and the final sleep window and determining an entrance time to the sleep mode so as to arrange a listening interval of the sleep-mode-requested subscriber station and listening intervals of other subscriber stations and group the subscriber stations; and
  (d) transmitting a sleep response message including the initial sleep window, the final sleep window, and a start frame to the subscriber station.

19. A method for processing traffic indication in a power saving mode of a subscriber station in a wireless portable Internet system, the method comprising:
  (a) reaching a frame for processing traffic indication of a predetermined sleep group, and checking which subscriber station's sleep window is expired from among the subscriber stations configuring the predetermined sleep group;
  (b) checking whether corresponding subscriber stations have data to be transmitted;

(c) controlling a base station to establish an indicator for traffic indication to the corresponding subscriber station when the data are found in the subscriber station;

(d) transmitting a traffic indication message when the subscriber stations belonging to the group are checked and the indicator is established; and (e) detecting the subscriber stations to be in the awake mode, the subscriber stations having established the indicator indicating that the subscriber stations have the data.

20. The method of claim 19, further comprising:
updating the sleep window corresponding to the subscriber station, and entering a state in which the subscriber station is in the sleep mode when no data are found in the subscriber station.

21. The method of claim 19, wherein the indicator includes a bitmap method and an identifier list of subscriber stations.

* * * * *